United States Patent
Okuno et al.

(10) Patent No.: US 12,282,000 B2
(45) Date of Patent: Apr. 22, 2025

(54) BIOLOGICAL SAMPLE ANALYSIS DEVICE AND BIOLOGICAL SAMPLE ANALYSIS METHOD

(71) Applicant: Hitachi High-Tech Corporation, Tokyo (JP)

(72) Inventors: Ayaka Okuno, Tokyo (JP); Michiru Fujioka, Tokyo (JP); Toru Yokoyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 583 days.

(21) Appl. No.: 17/761,453

(22) PCT Filed: Sep. 17, 2019

(86) PCT No.: PCT/JP2019/036364
§ 371 (c)(1),
(2) Date: Mar. 17, 2022

(87) PCT Pub. No.: WO2021/053713
PCT Pub. Date: Mar. 25, 2021

(65) Prior Publication Data
US 2022/0326179 A1    Oct. 13, 2022

(51) Int. Cl.
*G01N 27/447* (2006.01)
*G01N 27/453* (2006.01)
*G01N 30/86* (2006.01)

(52) U.S. Cl.
CPC ... *G01N 27/44721* (2013.01); *G01N 30/8631* (2013.01)

(58) Field of Classification Search
CPC .. G01N 27/44721; G01N 30/74; G01N 30/86; G01N 30/8631–8637; G01N 30/8665; G01N 2030/746
See application file for complete search history.

(56) References Cited

U.S. PATENT DOCUMENTS

| | | |
|---|---|---|
| 4,680,102 A | 7/1987 | Ishiwatari |
| 5,419,825 A | 5/1995 | Fuji |

(Continued)

FOREIGN PATENT DOCUMENTS

| | | |
|---|---|---|
| JP | 61-129561 A | 6/1986 |
| JP | 62-174631 A | 7/1987 |

(Continued)

OTHER PUBLICATIONS

Agilent OpenLab CDS ChemStation Edition—Reference to Operation Principles, author unknown, Edition Apr. 2019 (Year: 2019).*

(Continued)

*Primary Examiner* — Alexander S Noguerola
(74) *Attorney, Agent, or Firm* — Crowell & Moring LLP

(57) ABSTRACT

The present invention aims to provide a biological sample analysis device which achieves an improvement in accuracy of an analysis result, a reduction in reagent cost, and shortening of a required time. The biological sample analysis device according to the present invention compares first measurement data acquired by measuring a biological sample and second measurement data acquired by measuring a reference sample and determines that when the difference between the two exceeds a threshold value, it is necessary to remeasure the reference sample before remeasuring the biological sample and reacquire a reference value (refer to FIG. 3A).

14 Claims, 7 Drawing Sheets

(56) References Cited

U.S. PATENT DOCUMENTS

2002/0125136 A1* 9/2002 Sharaf .............. G01N 27/44726
 204/461
2004/0197925 A1 10/2004 Gill et al.

FOREIGN PATENT DOCUMENTS

| JP | 5-107227 A | 4/1993 |
| JP | 2008-545956 A | 12/2008 |
| JP | 2013-195139 A | 9/2013 |
| JP | 2015-6197 A | 1/2015 |
| WO | WO 2006/124842 A2 | 11/2006 |
| WO | WO 2018/151843 A2 | 8/2018 |

OTHER PUBLICATIONS

ChromQuest™ 4.2 Chromatography Data System User's Guide, author unknown, CHROM-97202 Revision A Apr. 2005 (Year: 2005).*

International Search Report (PCT/ISA/210) issued in PCT Application No. PCT/JP2019/036364 dated Nov. 5, 2019 with English translation (four (4) pages).

Japanese-language Written Opinion (PCT/ISA/237) issued in PCT Application No. PCT/JP2019/036364 dated Nov. 5, 2019 (five (5) pages).

Global Filer Express PCR Amplification Kit User Guide (Publication No. 4477672, Revision E) dated Oct. 13, 2020 (160 pages).

Japanese-language International Preliminary Report on Patentability (PCT/IPEA/409) issued in PCT Application No. PCT/JP2019/036364 dated Sep. 23, 2020 (four (4) pages).

* cited by examiner

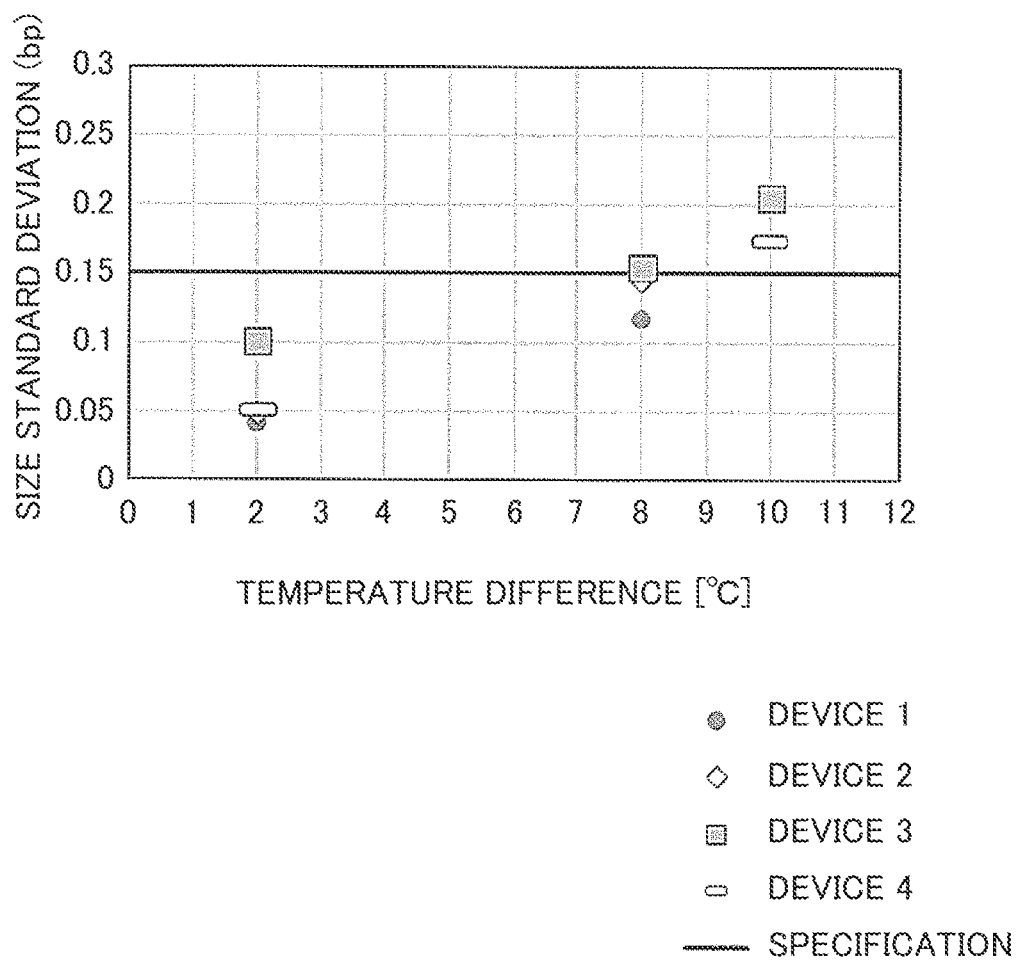

BIOLOGICAL SAMPLE ANALYSIS DEVICE AND BIOLOGICAL SAMPLE ANALYSIS METHOD

TECHNICAL FIELD

The present invention relates to a biological sample analysis device which analyzes a biological sample by using electrophoresis.

BACKGROUND ART

A DNA analysis using electrophoresis includes a fragment analysis, a sequence analysis, etc. As the fragment analysis, there may be mentioned, personal appraisal, an MSI (Micro-Satellite Instability) analysis, MLPA (Multiplex Ligation-dependent Probe Amplification), etc. Here, the personal appraisal will be explained as an example, but the present patent is not necessarily an invention specialized for the personal appraisal and can be applied even to other fragment analysis examples. DNA testing by analysis of deoxyribonucleic acid (DNA) polymorphisms is widely practiced for the purpose of criminal investigation and the judgement of blood relations, etc. The DNAs of organisms of the same species have almost similar base sequences, but in some places, they have different base sequences. Thus, the fact that there is diversity in the base sequence on DNA between individuals is called DNA polymorphism and is involved in the formation of individual differences at the gene level.

One of forms of DNA polymorphisms includes Short Tandem Repeat (STR), or microsatellite. It has been known that the STR is a characteristic sequence pattern in which a short sequence with about 2 to 7 base lengths is repeated several to several tens of times, and the number of times of repetition thereof varies depending on the individual. Analyzing the combination of the number of times of STR repetition at the locus of a specific gene is referred to as an STR analysis.

In DNA testing for the purpose of criminal investigation, etc., the STR analysis is used which utilizes the property that the combination of the number of times of repetition of STR differs among individuals. Since the difference in the number of times of repetition of STR appears due to the difference in alleles (Allele), the number of times of repetition of STR in an individual DNA marker is hereinafter referred to as an allele.

In order to extract a certain amount of DNA at the STR site used as a DNA marker, PCR (Polymerase Chain Reaction) is performed. The PCR is a technique for specifying certain base sequences called primer sequences at both ends of target DNA to thereby repeatedly amplify only a DNA fragment sandwiched between the primer sequences to obtain a sample of a certain amount of target DNA.

Electrophoresis is performed to measure the fragment length of the target DNA fragment obtained by PCR. The electrophoresis is a DNA fragment separation method utilizing the fact that a migration speed in a charged migration path differs depending on the length of the DNA fragment, and the longer the DNA fragment, the lower the migration speed. In recent years, capillary electrophoresis using a capillary as a migration path has been widely used as a method of electrophoresis.

In the capillary electrophoresis, a thin tube called a capillary is filled with a migration medium such as gel, and a DNA fragment of a sample is electrophoresed in this capillary. Then, the DNA fragment length is examined by measuring the time required for the sample to complete the migration for a fixed distance (usually from end to end of the capillary). Each sample, that is, each DNA fragment is labeled with a fluorescent dye, and a fluorescent signal of the migrated sample is detected by an optical detector placed at the end of the capillary.

A DNA fragment of an unknown sample amplified by PCR is mixed with a size standard labeled with a fluorescent dye different from that of the amplified DNA fragment during electrophoresis. The size standard is a reagent containing a DNA fragment of a known base length and is used as an index of base length to correct the difference in mobility between injections and between capillaries in the case of the plurality of capillaries.

However, even DNA fragments of the same base length strictly differ in mobility if they are labeled with different fluorescent dyes. Consequently, it is not possible to accurately calculate the mobilities of DNA fragments labeled with different dyes with the information of the size standard alone. Therefore, as in the case where the protocol of a reagent kit commencing with page 28 of Non-Patent Literature 1 is described, it is recommended to migrate a reagent called an allelic ladder at a specified frequency for more accurate analysis. The allelic ladder is a reagent containing an allele of high appearance frequency labeled with the same fluorescent dye as the unknown sample, and is used as reference data for determining a mobility correction coefficient for each dye. On the basis of the reference data of this allelic ladder, the correction coefficient is determined, and the mobility is corrected in the data of the unknown sample to analyze the base length of the DNA fragment.

The following Patent Literature 1 describes a technique related to a method of setting a capillary gel array/its analysis method like monitoring array performance by monitoring the result of a standard product corresponding to an allelic ladder in order to secure the accuracy of the result. In the same Literature, the accuracy of the allelic ladder as reference data is secured by determining by a system, an array suitable for the migration of the allelic ladder from the migration results of the previous run.

CITATION LIST

Patent Literature

PTL 1: US2004/0197925

Non-Patent Literature

NPTL 1: GlobalFiler Express PCR Amplification Kit USER GUIDE (Publication Number 4477672, Revision E)

SUMMARY OF INVENTION

Technical Problem

The mobility of a DNA fragment changes greatly depending on the temperature inside a device, the temperature of the environment outside the device, the pressure, the pH of a reagent, the degree of deterioration of the reagent, run parameters (voltage and the temperature of a migration unit, etc.), and the like. The amount of change in the mobility of the DNA fragment varies depending on the type of a labeled fluorescent dye and a base length. Thus, even within the number of injections specified on page 28 of Non-Patent Literature 1, when these conditions change from the time when the allelic ladder (reference data) is run, the relative velocity between the size standard and the DNA fragment (labeled with a fluorescent dye different from that of the size standard) varies. This may affect inter-dye correction and lead to erroneous analysis results. Alternatively, when the above-mentioned conditions do not change even in excess of the number of injections specified on page 28 of Non-Patent Literature 1, the reference data must be reacquired by migrating the allelic ladder despite the fact that there is no need to reacquire the reference data in practice. This unnecessarily increases reagent costs and also reduces system throughput due to an increase in the required time.

In Patent Literature 1, the system automatically selects an array suitable for migrating the allelic ladder. However, the technique described in the same Literature is not intended to migrate the allelic ladder to determine whether the reference data should be reacquired.

The present invention has been made in view of the above-described problems, and it is an object of the present invention to provide a biological sample analysis device which achieves an improvement in the accuracy of an analysis result, a reduction in reagent cost, and shortening of a required time.

Solution to Problem

A biological sample analysis device according to the present invention compares first measurement data acquired by measuring a biological sample and second measurement data acquired by measuring a reference sample and determines that when the difference between the two exceeds a threshold value, it is necessary to remeasure the reference sample before remeasuring the biological sample and reacquire a reference value.

Advantageous Effects of Invention

According to a biological sample analysis device according to the present invention, since it is determined based on measurement data obtained by actually measuring a biological sample whether or not it is necessary to remeasure a reference sample (for example, an allelic ladder), the accuracy of an analysis result is improved. Further, it is possible to achieve a reduction in reagent cost and an increase in the throughput of a system by suppressing unnecessary remeasurement of the reference sample.

BRIEF DESCRIPTION OF DRAWINGS

FIG. 11 is a graph illustrating the relationship between a temperature difference outside the device and a standard deviation of a DNA fragment length.

DESCRIPTION OF EMBODIMENTS

First Embodiment

Figure 1:
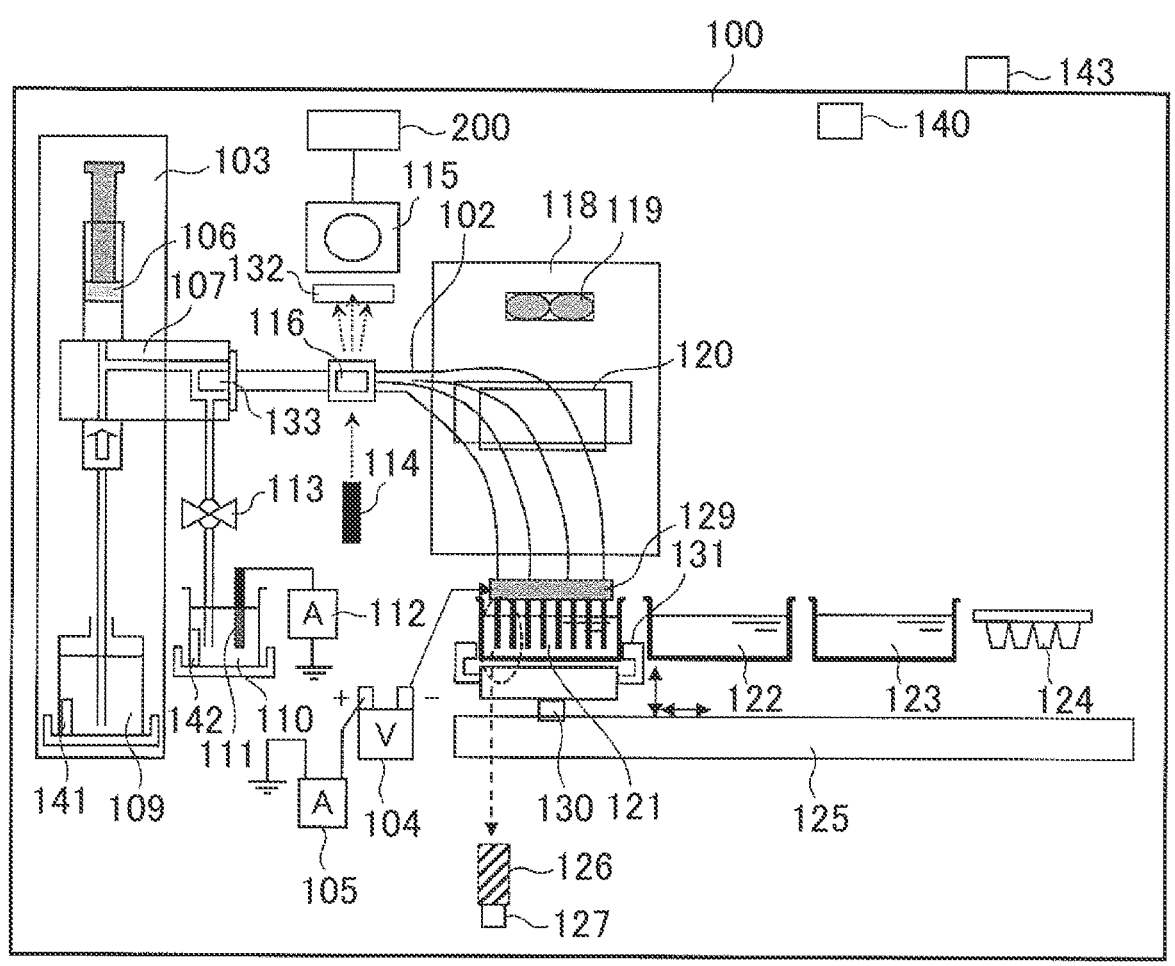
FIG. 1 is a configuration diagram of a biological sample analysis device 100 according to a first embodiment.

FIG. 1 is a configuration diagram of a biological sample analysis device 100 according to a first embodiment of the present invention. The biological sample analysis device 100 is a device which measures a biological sample by electrophoresing the same. Hereinafter, description will be made as to an example of measuring a fragment length of a DNA molecule as a biological sample.

The biological sample analysis device 100 includes a detection unit 116, a thermostat oven 118, a transporter 125, a high-voltage power supply 104, a first ammeter 105, a second ammeter 112, a capillary 102, and a pump mechanism 103. The detection unit 116 optically detects a sample. The thermostat oven 118 maintains the capillary 102 at a constant temperature. The transporter 125 transports various containers to capillary cathode ends. The high-voltage power supply 104 applies a high voltage to the capillary 102. The first ammeter 105 measures a current output by the high-voltage power supply 104. The second ammeter 112 measures a current which flows in an anode-side electrode 111. The pump mechanism 103 injects a polymer into the capillary 102.

The capillary 102 includes a load header 129, the detection unit 116, and a capillary head 133. In the cases such as when the capillary 102 is damaged or deteriorated in quality, when its usage time limit is expired, and when the number of times of its use is used up, it is replaced with a new capillary 102.

The capillary 102 is composed of a glass tube having an inner diameter of several tens to several hundreds of microns and an outer diameter of several hundreds of microns, and the surface thereof is coated with polyimide in order to improve the strength thereof. However, a light irradiation portion irradiated with laser light has the polyimide coating removed so that internal light emission is likely to leak to the outside. The inside of the capillary 102 is filled with a separation medium for giving a difference in migration speed during electrophoresis. Although the separation medium includes one having fluidity and one having non-fluidity, a fluid polymer is used in the present first embodiment.

The detection unit 116 is some area of the capillary 102. When the detection unit 116 is irradiated with excitation light from a light source 114, fluorescence (hereinafter referred to as information light) having a wavelength depending on the sample is generated from the sample and emitted to the outside of the capillary 102. The information light is spectrally dispersed in the wavelength direction by a diffraction grating 132. An optical detector 115 detects the spectrally-dispersed information light to thereby analyze the sample.

Each of the capillary cathode ends 127 is fixed through a metal-made hollow electrode 126, and the capillary tip protrudes from the hollow electrode 126 by about 0.5 mm. All the hollow electrodes 126 provided for each capillary are integrally attached to the load header 129. All the hollow electrodes 126 are made conductive to the high-voltage power supply 104 mounted on the device main body, and operate as cathode electrodes when a voltage needs to be applied such as electrophoresis or sample introduction.

The capillary ends (other ends) each opposite to the capillary cathode end 127 are bundled together by the capillary head 133. The capillary head 133 can be connected to a block 107 in a pressure-resisting air-tight manner. The high voltage output by the high-voltage power supply 104 is applied between the load header 129 and the capillary head 133. A syringe 106 fills the capillary with a new polymer from the other end. Refilling the polymer in the capillary is performed for each measurement in order to improve the performance of the measurement.

The pump mechanism 103 is comprised of the syringe 106 and a mechanism system for pressurizing the syringe 106. The block 107 is a connection member for communicating the syringe 106, the capillary 102, an anode buffer container 110, and a polymer container 109 with each other.

An optical detection unit which detects the information light from the sample is comprised of the light source 114, the optical detector 115 for detecting light emission in the detection unit 116, and the diffraction grating 132. When the sample in the capillary separated by electrophoresis is detected, the detection unit 116 for the capillary is irradiated by the light source 114, and the light emission from the detection unit 116 is spectrally dispersed by the diffraction grating 132, and the optical detector 115 detects the spectrally-dispersed information light.

The thermostat oven 118 is covered with a heat insulating material in order to keep the inside thereof at a constant temperature and controlled in temperature by a heating/cooling mechanism 120. A fan 119 circulates and stirs air in the thermostat oven 118 to keep the temperature of the capillary 102 uniformly and constant in position.

The transporter 125 includes up to three electric motors and a linear actuator and is movable up to three axes in the vertical direction, the horizontal direction, and the depth direction. At least one or more containers can be placed on a moving stage 130 of the transporter 125. The moving stage 130 is provided with an electric grip 131, and a user is able to grasp and release each container through the grip 131. Therefore, a buffer container 121, a cleaning container 122, a waste liquid container 123, and a sample container 124 can be conveyed to the capillary cathode end 127 as necessary. Unnecessary containers are stored in a predetermined storage site in the device.

A computing device 200 executes processing of acquiring a detection result of the information light from the optical detector 115, analyzing it to create a fluorescence intensity waveform to be described later, and calculating a base length of a substance to be measured, and the like. The details of the processing executed by the computing device 200 and other parts shown in FIG. 1 will be described later. Hereinafter, the respective members that provide measurement results to the computing device 200 may be collectively called a "measurement unit". The computing device 200 can be configured by, for example, a Central Processing Unit (CPU) or the like.

Figure 2:
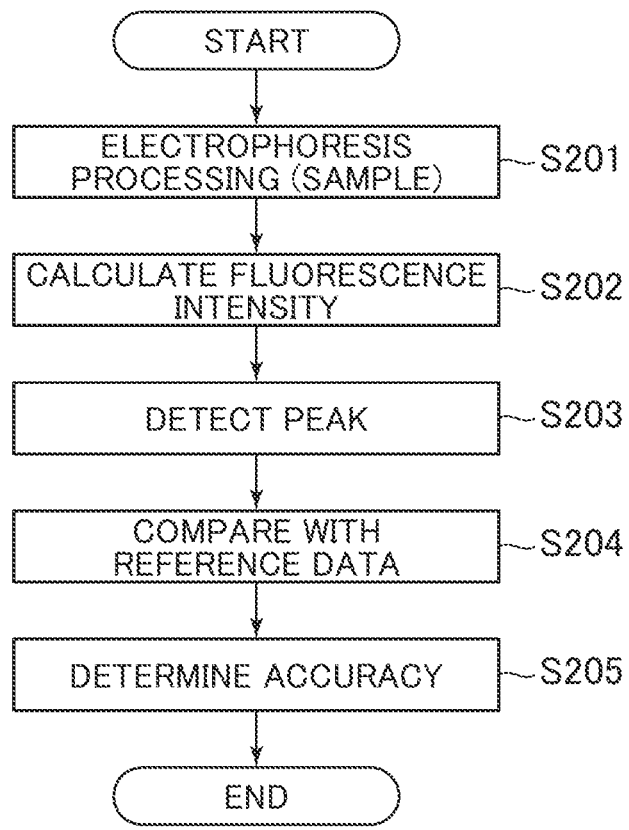
FIG. 2 is a flowchart describing an operation procedure of the biological sample analysis device 100.

FIG. 2 is a flowchart describing an operation procedure of the biological sample analysis device 100. In S201, an actual sample to be analyzed is electrophoresed. In S202, the fluorescence intensity of each fluorescent dye is calculated from spectral waveform data acquired through the electrophoresis. In S203, a peak is detected from the waveform of the fluorescence intensity. At this time, the processing of SizeCall may be executed. The SizeCall is processing of executing mapping between an acquired peak time and the already-known DNA fragment length as a size standard to thereby obtain a correspondence relation between the peak time and the DNA fragment length. A calibration curve to be described later can be used in this Step. In S204, a comparison is made between reference data acquired by electrophoresing an allelic ladder and the fluorescence intensity waveform acquired in S202 and S203. In S205, the accuracy of the measurement data in S202 and S203 is determined based on the result of comparison in S204.

Figure 3A:
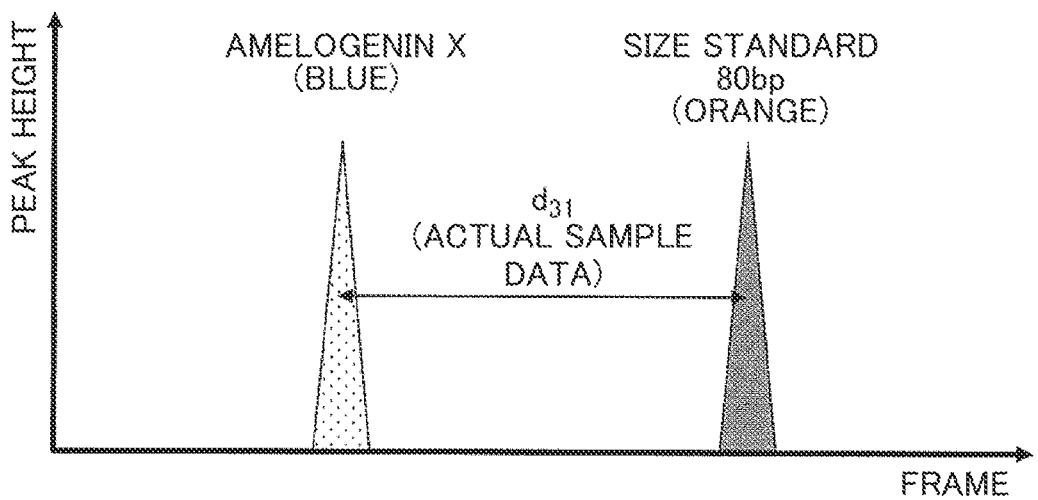
FIG. 3A is an example of a fluorescence intensity waveform in actual sample data acquired in S202.

FIG. 3A is an example of a fluorescence intensity waveform in the actual sample data acquired in S202. Here, as the sample, there is used one including a fragment (fluorescent label in orange) of 80 bp (base pair) as the size standard and including a fragment (fluorescent label in blue) derived from the X chromosome of Amelogenin being a locus for gender determination. An allelic ladder to be described later also includes the same fragments as these two. Each fragment in the allelic ladder serves as a "reference sample" serving as a basis for quantifying a biological sample in an actual sample. In S204, a difference $d_{31}$ between two peaks that appear on the fluorescence intensity waveform is acquired.

Figure 3B:
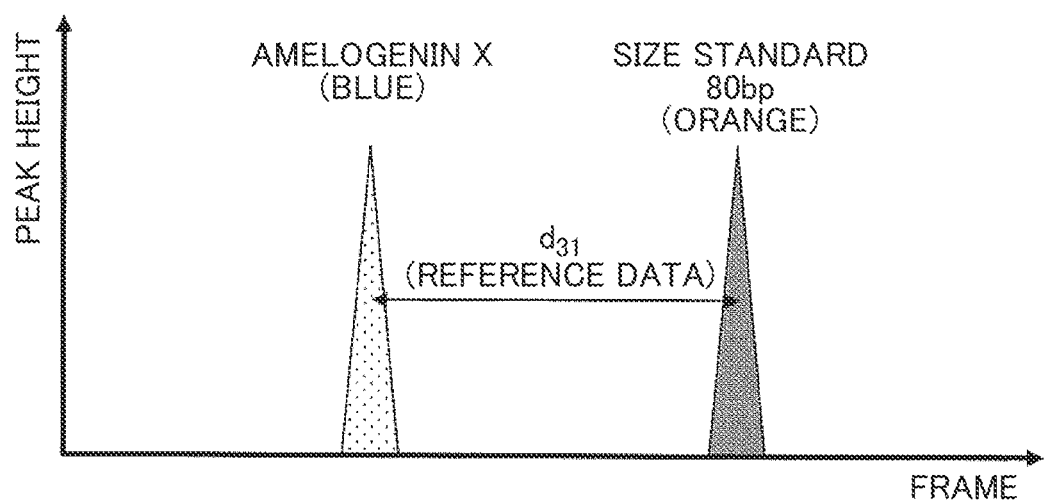
FIG. 3B is an example of a fluorescence intensity waveform in reference data.

FIG. 3B is an example of a fluorescence intensity waveform in reference data. The reference data is data descriptive of a fluorescence intensity waveform similar to that in the sample, which is acquired by electrophoresing an allelic ladder. Even in the reference data, $d_{31}$ can be acquired. When the mobility of a DNA fragment changes from the time when the reference data is acquired previously, it is assumed that a deviation occurs between $d_{31}$ in the actual sample data and $d_{31}$ in the reference data. Therefore, it is checked in S204 and S205 whether or not the deviation in $d_{31}$ is within a threshold value, whereby it is possible to determine the accuracy of the actual sample data.

In order to improve the determination accuracy in S204 and S205, it is desirable to calculate $d_{31}$ as accurately as possible. Since the size standard provides a reference waveform of a base length in both the actual sample and the allelic ladder, it is desirable to use it as the reference. Since the fragment derived from the X chromosome also appears regardless of gender, it is suitable as the reference. Thus, in FIGS. 3A and 3B, $d_{31}$ will be calculated using these. Similarly, other fragment peaks suitable as the reference for calculating $d_{31}$ may be used.

Since the fluorescence intensity waveform becomes the peak when the substance to be measured passes through the detection unit 116, $d_{31}$ can be calculated as the difference between the peak times on the fluorescence intensity waveform. Alternatively, when the number of data frames per second is defined, the number of data frames can also be used instead of the time. In addition, an appropriate numerical value which can specify a peak position on the fluorescence intensity waveform may be used.

Figure 4:
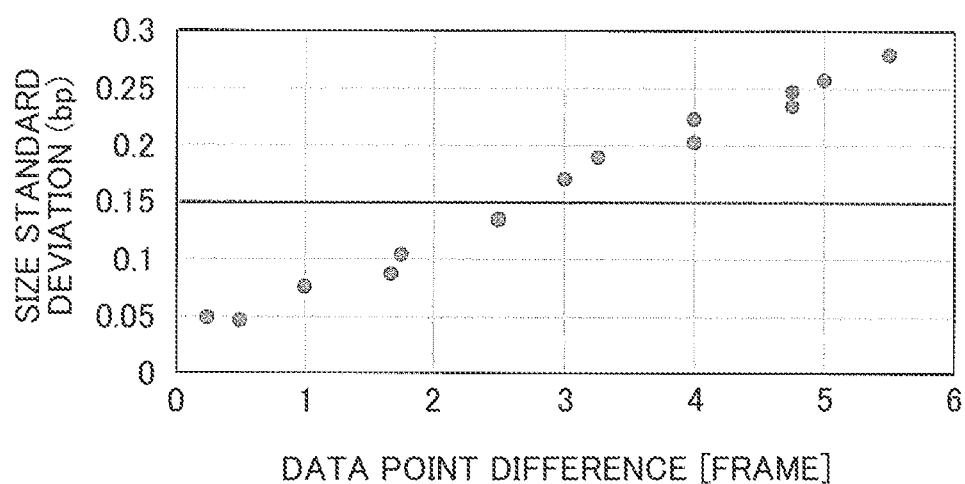
FIG. 4 is a graph illustrating the relationship between a difference of $d_{31}$ and a standard deviation of a DNA fragment length.

FIG. 4 is a graph illustrating the relationship between a difference of $d_{31}$ and a standard deviation of a DNA fragment length. As a sample to be measured, a fragment derived from the X chromosome of Amelogenin was used. $d_{31}$ was calculated by electrophoresing an actual sample fourteen times with respect to the electrophoresis of the allelic ladder once under a 30° C. environment where a polymer is prone to deteriorate. Data points on FIG. 4 correspond to the respective number of times of measurement.

The fluorescence intensity waveform itself is data descriptive of light intensity, but does not directly represent the DNA fragment length. Therefore, there is required a procedure of acquiring the DNA fragment length from the fluorescence intensity waveform and further plotting the difference between the actual sample and the allelic ladder in the format of FIG. 4. The procedure of acquiring the data points in FIG. 4 will be described below.

In the process of measuring the actual sample, reference is made to a frame time of the fluorescence intensity waveform peak corresponding to the size standard to thereby make it possible to obtain a correspondence relation (first correspondence relationship) between a fluorescence intensity waveform peak of a substance (including a target to be measured) contained in the actual sample, and a base length corresponding to the fluorescence intensity waveform peak. This is because the frame time of the peak corresponds to mobility, and further there is a correspondence relation between the mobility and the DNA fragment length. The computing device 200 creates a calibration curve using the correspondence relation. It can also be said that the calibration curve describes the correspondence relation between the frame time and the base length. Even as to the allelic ladder, similarly, a calibration curve is created by acquiring a correspondence relation (second correspondence relationship).

The computing device 200 specifies the base length of a substance to be measured (fragment derived from the X chromosome of Amelogenin here) by using the fluorescence intensity waveform peak of the actual sample and the calibration curve. Even in the same substance to be measured in the allelic ladder, the computing device similarly specifies the base length thereof. Thus, it is possible to quantify the DNA sample (i.e., specify the base length). In the process of its quantification, it is possible to obtain a standard deviation (vertical axis in FIG. 4) between the base length of the fragment of the actual sample in the result of quantification and the base length of the fragment of the allelic ladder.

The difference may occur between the base lengths of both samples. The computing device 200 further specifies a difference of $d_{31}$ when specifying the base lengths of both the actual sample and the allelic ladder. The difference between these base lengths and the difference of $d_{31}$ are plotted as the data points, so that the graph of FIG. 4 can be created.

According to the graph shown in FIG. 4, in the biological sample analysis device 100, the difference of $d_{31}$ is required to be less than or equal to three frames in order to keep the base length standard deviation between the measurement result of the actual sample and the measurement result of the allelic ladder 0.15 bp or less. Therefore, for example, when the difference of $d_{31}$ becomes two frames or more, the computing device 200 may output such an alert (for example, a message display on the screen, the same applies below) as to recommend re-migration of the allelic ladder to improve the accuracy of data. Further, when the difference of $d_{31}$ becomes three frames or more, the computing device 200 may lock the actual sample so that it cannot be remeasured until the reference value (for example, the frame time of the size standard, or the like) is reacquired by remeasuring the allelic ladder. From these, the user is capable of remeasuring the allelic ladder at an appropriate timing to ensure the accuracy of data and reducing reagent cost.

As an alternative to the difference of $d_{31}$, the computing device 200 may compare the qualified DNA fragment length between the actual sample and the allelic ladder. This is because the procedure of specifying the DNA fragment length through the calibration curve always occurs. In this case, the measurement unit is locked if the base length standard deviation between the actual sample and the allelic ladder becomes greater than or equal to 0.15 bp.

First Embodiment: Summary

The biological sample analysis device 100 according to the first embodiment compares the difference between the first measurement data (actual sample) and the second measurement data (allelic ladder) with the threshold value to thereby determine whether or not it is necessary to remeasure the second sample (allelic ladder). Consequently, it is possible to capture the change in mobility of the DNA fragment due to the environment or the like and determine with high accuracy whether or not it is necessary to reacquire the reference data.

The biological sample analysis device 100 according to the first embodiment acquires the inter-frame distance $d_{31}$ between the fluorescence intensity waveform peak of the size standard and the fluorescence intensity waveform peak of the substance to be measured for each of the actual sample and the allelic ladder and compares the difference of $d_{31}$ between both measured data with the threshold value. Since the size standard is always included to specify the DNA fragment length, it is suitable as the basis for calculating the difference of $d_{31}$. That is, since the difference of $d_{31}$ can be accurately calculated, it is possible to determine with high accuracy whether or not it is necessary to reacquire the reference data.

Second Embodiment

In the first embodiment, the frame distance between the fluorescence intensity waveform peak of one size standard and the fluorescence intensity waveform peak of the substance to be measured is used. A second embodiment of the present invention will describe an example in which a fluorescence intensity waveform peak of a substance to be measured is compared with fluorescence intensity waveform peaks of two size standards. Consequently, the accuracy of the frame distance is improved. The configuration of a biological sample analysis device 100 is the same as that of the first embodiment.

Figure 5:
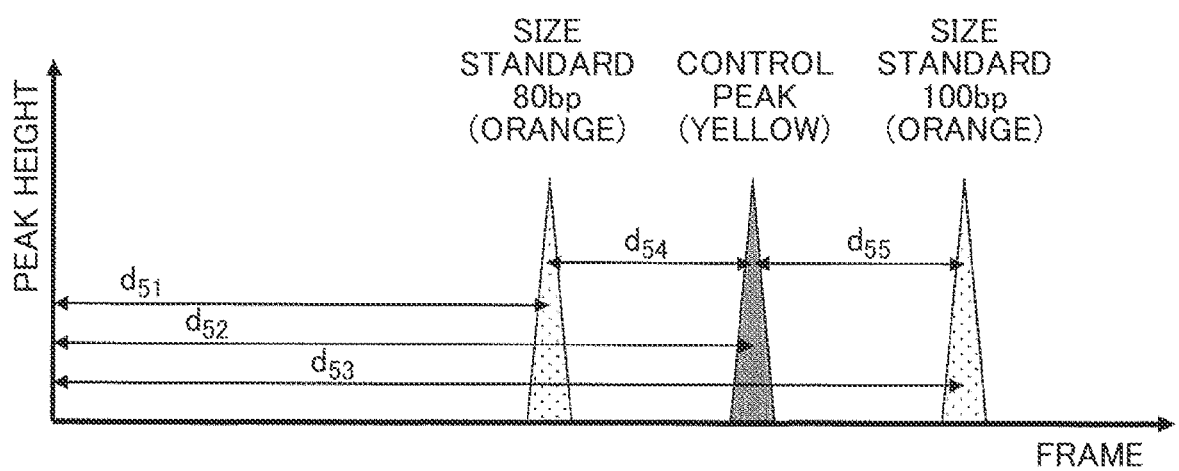
FIG. 5 is an example of a fluorescence intensity waveform in actual sample data in a second embodiment.

FIG. 5 is an example of each fluorescence intensity waveform in actual sample data in the second embodiment. In the example shown in FIG. 5, a fragment of a base length 80 bp and a fragment of a base length 100 bp (each fluorescently labeled in orange) are used as the size standards. A fragment that provides the peak, other than the size standards is shown as a fragment (fluorescently labeled in yellow) of a control peak in FIG. 5. As the control peak, there is selected one which is labeled with a dye different from that for the size standard and appears between the two size standard peaks.

The computing device 200 monitors differences $d_{54}$ and $d_{55}$ in the number of data points and compares them with a threshold value. As will be described later, the ratio $d_{55}/d_{54}$ (or $d_{54}/d_{55}$) between these may be compared with the threshold value, or the difference (or the absolute value of the difference) between $d_{54}$ and $d_{55}$ may be compared with the threshold value. Hereinafter, description will be made as to an example of monitoring the ratio between these.

Figure 6:
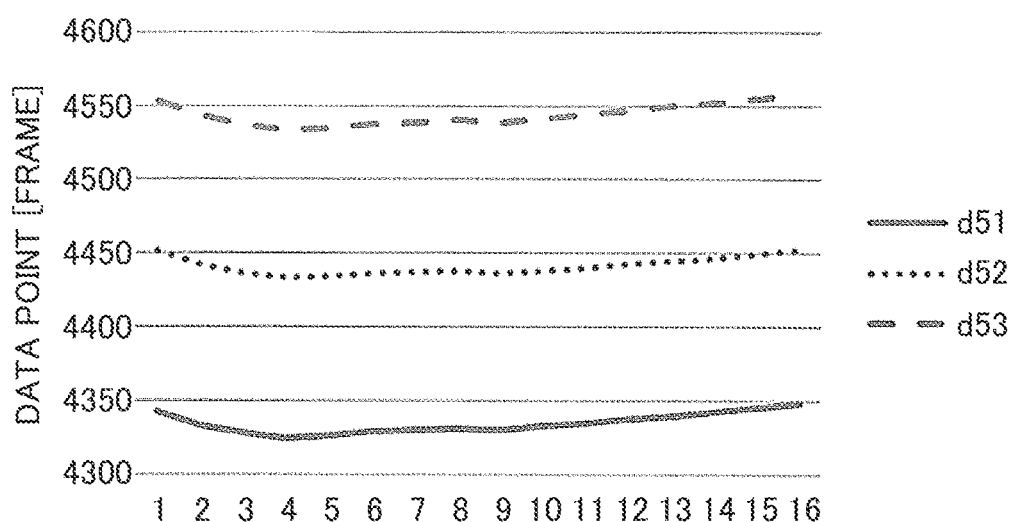
FIG. 6 is a graph showing the transition of $d_{51}$, $d_{52}$, and $d_{53}$ when electrophoresis is executed sixteen times under a 30° C. environment where a polymer is prone to deteriorate.

FIG. 6 is a graph showing the transition of $d_{51}$, $d_{52}$, and $d_{53}$ at the time when electrophoresis is executed sixteen times under a 30° C. environment where a polymer is prone to deteriorate. The horizontal axis is the number (injection number) for the number of execution times. $d_{51}$ to $d_{53}$ correspond to an elapsed time from the start time of the measurement to the detection time of each peak.

Figure 7:
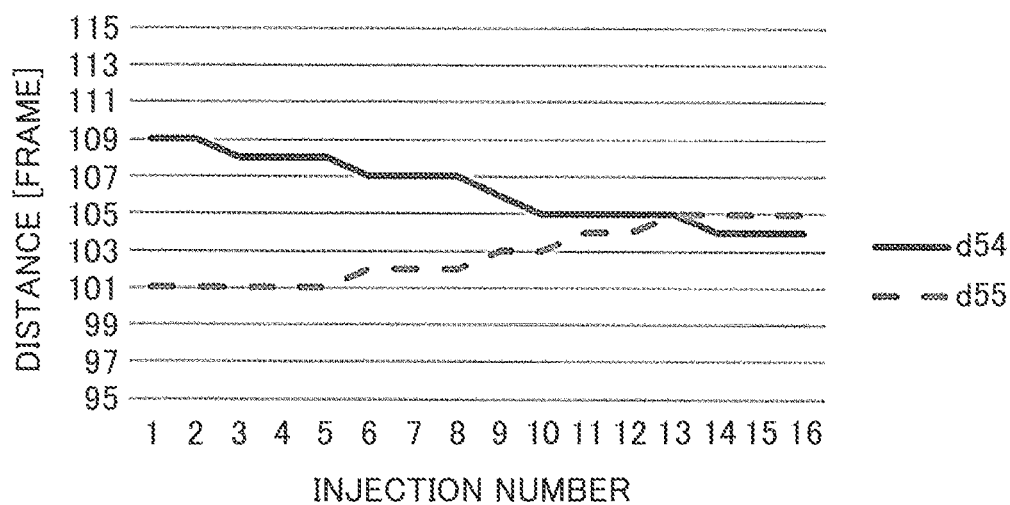
FIG. 7 is a graph showing the transition of $d_{54}$ and $d_{55}$ when the data in FIG. 6 is acquired.

FIG. 7 is a graph showing the transition of $d_{54}$ and $d_{55}$ when data of FIG. 6 is acquired. According to FIG. 7, it is understood that with the lapse of time, $d_{54}$ decreases, whereas $d_{55}$ increases. This shows that a fragment fluorescently labeled in yellow is migrated faster than a fragment fluorescently labeled in orange. The computing device 200 monitors the value of $d_{55}/d_{54}$ to detect this deviation.

Figure 8:
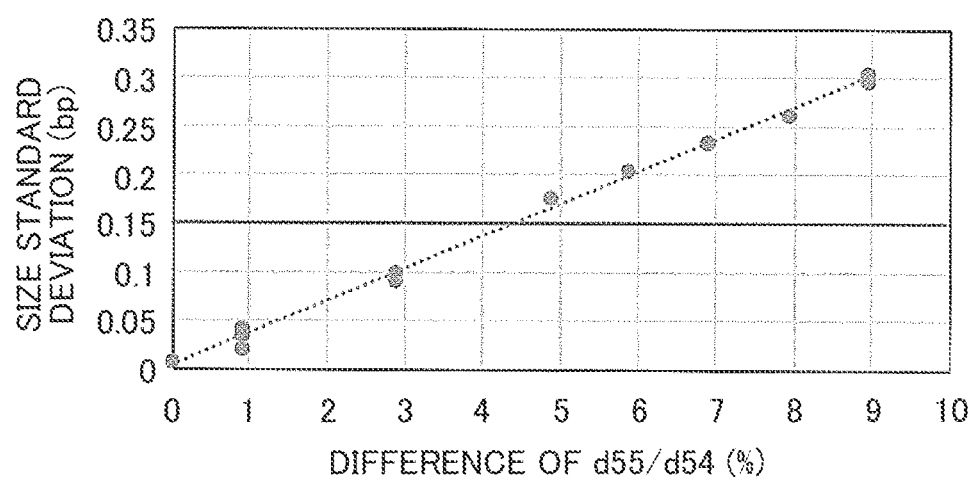
FIG. 8 is a graph illustrating the relationship between a difference of $d_{55}/d_{54}$ and a standard deviation of a DNA fragment length.

FIG. 8 is a graph illustrating the relationship between a difference of $d_{55}/d_{54}$ and a standard deviation of a DNA fragment length. The DNA fragment length standard deviation can be determined by a method similar to that described in FIG. 4. The computing device 200 can calculate the difference between $d_{55}/d_{54}$ in an actual sample and $d_{55}/d_{54}$ in an allelic ladder, and plot the relationship between the difference and the DNA fragment length standard deviation as shown in FIG. 8.

According to the graph shown in FIG. 8, in the biological sample analysis device 100, the difference of $d_{55}/d_{54}$ is required to be less than or equal to about 4% in order to keep the base length standard deviation between the measurement result of the actual sample and the measurement result of the allelic ladder 0.15 bp or less. Therefore, as with the first embodiment, the computing device 200 may output an alert when the difference of $d_{55}/d_{54}$ becomes 3.5% or more, and may lock the measurement unit when it becomes 4.0% or more. Consequently, the same effect as in the first embodiment can be exhibited.

Third Embodiment

The above-described embodiment has described the example in which the size standard peak and other fragment peaks are included in the sample. In a third embodiment of the present invention, description will be made as to an example of determining whether or not it is necessary to remeasure the allelic ladder, without using the fragment peak of the size standard. The configuration of a biological sample analysis device 100 is the same as those of the first and second embodiments.

In the third embodiment, of a sample with multiple peaks of a fluorescence intensity waveform, a base length of a fragment (fluorescently labeled in red) having a peak in the vicinity of 447 bp was monitored as a control peak. As the control peak, there was selected one which is labeled with a dye different from the size standard and appears on the long base side in a detection range where migration is easily disturbed.

The computing device 200 calculates a standard deviation between a base length of a control peak in the actual sample and a base length of a control peak in the allelic ladder. A procedure of calculating the standard deviation is similar to that described in the first embodiment. When the standard deviation becomes, for example, 0.14 bp or more, the computing device 200 outputs such an alert as to recommend the remigration of the allelic ladder as with the first embodiment, and applies lock to the measurement unit when the standard deviation becomes 0.15 bp or more. Consequently, it is possible to exhibit a similar effect to the first embodiment. Further, since there are few fragment peaks to monitor as compared with the first and second embodiments, it is possible to simplify the procedure of determining whether it is necessary to remeasure the allelic ladder.

When the computing device 200 compares the base lengths, the frame time and the calibration curve are used as described in the first embodiment. Thus, instead of the comparison between the base lengths themselves, a control-peak time difference between the actual sample and the allelic ladder can also be used. It can be said that these procedures substantially compare the same measurement results (i.e., the base lengths).

Fourth Embodiment

The above embodiment has explained the example in which it is determined using the fluorescence intensity waveform data of the sample whether or not remeasurement of the allelic ladder is necessary. A fourth embodiment of the present invention will describe an example in which other parameters affecting the mobility of a DNA fragment are measured instead of the fluorescence intensity waveform to thereby determine whether or not the remeasurement of a allelic ladder is necessary. The configuration of a biological sample analysis device 100 is the same as those of the first and second embodiments.

Figure 9:
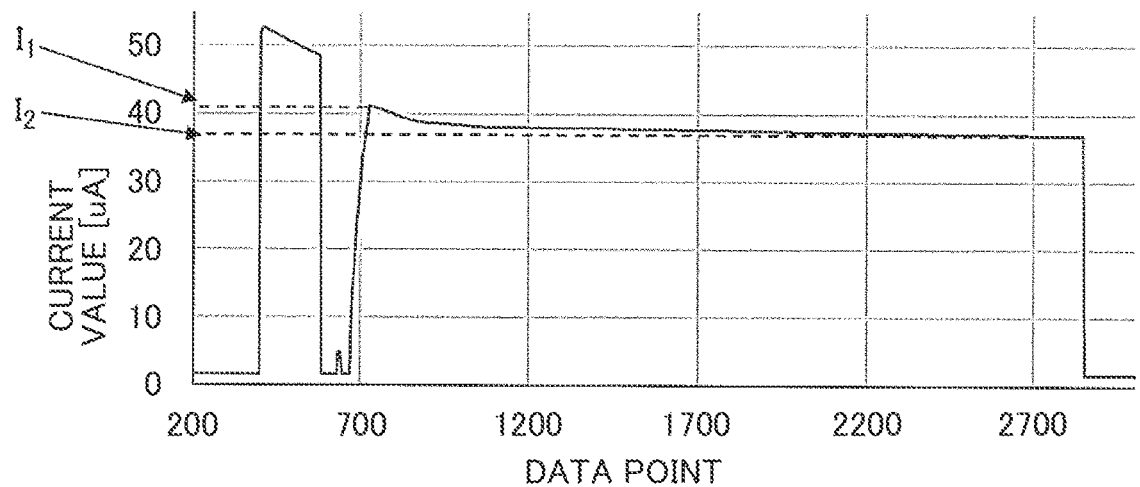
FIG. 9 is a graph illustrating a change in a current value measured by a second ammeter 112 when electrophoresing a sample in a capillary.

FIG. 9 is a graph illustrating the fluctuation of a current value measured by the second ammeter 112 when electrophoresing a sample within a capillary. The second ammeter 112 measures a current flowing in the capillary. It is considered that the current flowing in the capillary affects the mobility of the DNA fragment in the capillary. Therefore, a current value $I_1$ or $I_2$ in FIG. 9 is measured to thereby determine whether or not the mobility has changed significantly since reference data was acquired last time (i.e., whether it is necessary to remeasure the allelic ladder).

In FIG. 9, $I_1$ is a current value at the start of sample electrophoresis in the capillary. 12 is a current value immediately before the end of electrophoresis. For example, a derived value may be used like the inclinations of these current values with respect to the elapsed time, etc. Hereinafter, description will be made as to an example in which $I_2$ is used.

Figure 10:
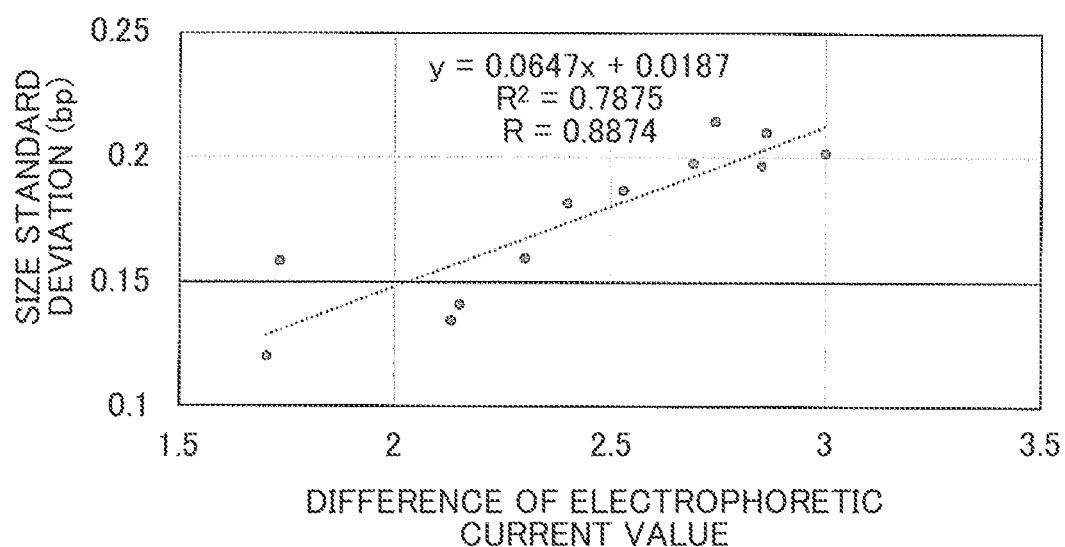
FIG. 10 is a graph illustrating the relationship between a difference of $I_2$ and a standard deviation of a DNA fragment length.

FIG. 10 is a graph illustrating the relationship between a difference of $I_2$ and a standard deviation of a DNA fragment length. Electrophoresis is executed sixteen times under a 30° C. environment where a polymer is prone to deteriorate, thereby to acquire an amount of change between the first $I_2$ and the sixteenth $I_2$ (referred to as $I_{2\_var}$ for convenience). Further, $I_{2\_var}$ is acquired in each of the actual sample and the allelic ladder, and a difference of $I_{2\_var}$ between the actual sample and the allelic ladder is taken as the horizontal axis of FIG. 10. The vertical axis is a DNA fragment length difference between the actual sample and the allelic ladder in a manner similar to the first and second embodiments. Each time the difference of $I_{2\_var}$ is acquired, one data point of FIG. 10 is plotted.

According to the graph shown in FIG. 10, in the biological sample analysis device 100, the difference of $I_{2\_var}$ is required to be less than 2.25 µA in order to keep a base length standard deviation between a measurement result of the actual sample and a measurement result of the allelic ladder 0.15 bp or less. Therefore, as with the first embodiment, the computing device 200 may output an alert when the difference of $I_{2\_var}$ becomes 2.00 µA or more, and lock the measurement unit when it becomes 2.25 µA or more. Consequently, the same effect as in the first embodiment can be exhibited.

As the parameters which affect the mobility of the DNA fragment, those other than the current value flowing through the capillary may be used. For example, as sensors for measuring these parameters, there are exemplified in FIG. 1, an in-device sensor 140, a polymer sensor 141, a buffer solution sensor 142, and an out-device sensor 143. The in-device sensor 140 is a sensor for acquiring environment information in the biological sample analysis device 100, and the out-device sensor 143 is a sensor for acquiring environment information outside the biological sample analysis device 100. Examples of the environment information include a temperature, humidity, atmospheric pressure, etc. The polymer sensor 141 is a sensor group for acquiring information about the quality of a polymer, which includes a PH sensor and an electrical conductivity sensor as examples. There is shown in FIG. 1, an example in which the polymer sensor 141 is installed in the polymer container 209, but the installation thereof is not limited to this position. The buffer solution sensor 142 is a sensor group for acquiring information about the quality of a buffer solution, which includes a temperature sensor as an example. There is shown in FIG. 1, an example in which the buffer solution sensor 142 is installed in the anode buffer container 110, but the installation thereof is not limited to this position. Further, the buffer solution sensor 142 may be set in the buffer container 121. Information or the like about consumables such as the number of times the polymer or buffer solution has been used, the elapsed days thereof, and the lot number thereof, and the number of times the capillary has been used, the elapsed days thereof, and the lot number thereof, etc. may be set as input values.

The above parameters which affect the mobility of DNA may be used in multiple combination. Alternatively, the parameters may be combined with the monitoring of the frame position of each fragment such as shown in the first to third embodiments.

Fifth Embodiment

A fifth embodiment of the present invention will describe an example in which an environment temperature measured by the out-device sensor 143 is measured as a parameter which affects the mobility of a DNA fragment. The configuration of a biological sample analysis device 100 is the same as those of the first and second embodiments.

FIG. 11 is a graph illustrating the relationship between a temperature difference outside the device and a standard deviation of a DNA fragment length. The horizontal axis of FIG. 11 is a difference between a temperature measured by the out-device sensor 143 when measuring an actual sample, and a temperature measured by the out-device sensor 143 when measuring an allelic ladder. The vertical axis is a DNA fragment length standard deviation calculated for a fragment of 470 bp. Similar measurements are performed on four biological sample analysis devices 100 The results of each measurement are plotted as shown in FIG. 11. The allelic ladder was electrophoresed under a 20° C. environment, and the actual sample was measured under each of 22° C., 28° C. and 30° C. environments.

According to the graph shown in FIG. 11, in the biological sample analysis device 100, the difference in temperature between the time of measurement of the allelic ladder and the time of measurement of the actual sample is required to be less than approximately 10° C. in order to keep the base length standard deviation of the measurement result of the actual sample 0.15 bp or less. Therefore, as with the first embodiment, the computing device 200 may output an alert when the temperature difference becomes 8° C. or more, and lock the measurement unit when it becomes 10° C. or more. Consequently, the same effect as in the first embodiment can be exhibited.

Modifications of the Present Invention

The present invention is not limited to the aforementioned embodiments and includes various modifications. For example, the above-described embodiments have been described in detail to explain the present invention in an easy-to-understand manner, but are not necessarily limited to those having all the configurations described. Also, a part of the configuration of one embodiment can be replaced with the configuration of another embodiment, and the configuration of another embodiment can be added to the configuration of one embodiment. Further, it is possible to add, delete, and replace other configurations for a part of the configuration of each embodiment.

In the above embodiments, the determination threshold value (for example, the threshold value in S205, the threshold value to be compared with the difference in the third embodiment, etc.) may be a system fixed value or a value set by the user. The threshold value may be set individually in association with the application, the type of a reagent, an electrophoresis parameter, etc. The electrophoresis parameter is a parameter about an electrophoresis behavior such as a migration temperature, a migration voltage, a boosting speed or the like.

In the first to third embodiments, as the fragment for monitoring the fluorescence intensity waveform peak, each of a fragment on the short base side in the detection range, a fragment on the long base side, and a medium length fragment can also be used in the singular, or these may be combined plurally.

In the second embodiment, $d_{55}/d_{54}$ has been targeted for monitoring, but values such as a value obtained by subtracting two peak-to-peak distances, a value obtained by dividing one peak-to-peak distance by the sum of the peak-to-peak distances, etc. may be targeted for monitoring. Further, the peaks to be monitored may all be labeled with different fluorescent dyes, or may include fragments labeled with the same fluorescent dye. The number of peaks to be monitored does not have to be two. For example, four or more fluorescence intensity waveform peaks may be monitored. For example, the same number of peaks as the types of fluorescent dyes included in a reagent kit may be monitored, or a larger number of peaks may be monitored.

In the third embodiment, as the fragment to be monitored, a fragment with a base length that is more easily disturbed than the reagent kit may be targeted for detection, or there may be fragments located on the longer base side and shorter base side than the fragment, and between the two, etc. Two or more fragment peaks except for the size standard may be monitored.

In the first to third embodiments, the frame position of the fragment peak to be monitored may be an absolute position (equivalent to the elapsed time from the start of measurement) of a specific fragment, or may be a relative position (equivalent to the difference between a peak time of a substance to be measured and a peak time of another substance) defined by a plurality of fragments. The number of fragment peaks to be monitored may be three or more.

In the first to third embodiments, the fragment to be monitored may be set as a sample-independent peak in addition to the size standard. There may be mentioned, for example, (a) allele peaks appearing in all samples, (b) a quality sensor contained in a reagent kit to determine the quality of the PCR reaction, etc. In addition, a sample is mixed with the fluorescently labeled oligonucleotide before or after PCR, and its peak may be monitored.

In the above embodiments, as the method of locking the measurement unit, any can be used as long as it makes it impossible to quantify the sample. There are considered, for example, the cutting off of the power supply to the light source, the shutting off of power for electrophoresis, the limiting of the function of software for operation, etc. In addition, an appropriate method may be used.

In the above embodiments, the allelic ladder was exemplified as the reference sample that provides the reference for measuring the DNA fragment length. The subject of the present invention is not limited to this. A reference sample other than the allelic ladder can be used as long as it provides reference data serving as a basis for quantifying a biological sample and can be compared with actual sample data.

Although the above embodiments have described that the DNA fragment length is measured as the example of the biological sample, the present invention can be applied even to biological samples other than that. That is, the present invention can be applied to the case where for the biological sample quantified via electrophoresis, it is determined based on the difference between actual sample data and reference data (the result of measurement of a reference sample that provides a basis for quantification) whether it is necessary to remeasure the reference sample.

The above embodiments have explained the example of monitoring the numerical values such as $d_{31}$ so that the standard deviation of the DNA fragment length becomes, for example, 0.15 bp or less. Instead of the standard deviation of the DNA fragment length, the difference between the DNA fragment length of the actual sample and the DNA fragment length of the allelic ladder may be set to be an appropriate threshold value or less. Even in this case, the same effect as that of the present invention can be obtained. The numerical values to be monitored are the same as those in the above embodiments.

LIST OF REFERENCE SIGNS

102: capillary,
103: pump mechanism,
104: high-voltage power supply,
105: first ammeter,
106: syringe,
107: block,
109: polymer container,
110: anode buffer container,
111: anode-side electrode,
112: second ammeter,
113: solenoid valve,
114: light source,
115: optical detector,
116: detection unit,
118: thermostat oven,
119: fan,
120: heating/cooling mechanism,
121: buffer container,
122: cleaning container,
123: waste liquid container,
124: sample container,
125: transporter,
126: hollow electrode,
127: capillary cathode end,
129: load header,
130: moving stage,
131: grip,
132: diffraction grating,
133: capillary head,
140: in-device sensor,
141: polymer sensor,
142: buffer solution sensor,
143: out-device sensor,
200: computing device.

The invention claimed is:

1. A biological sample analysis device which analyzes a biological sample by using electrophoresis, comprising:
   a measurement unit configured to measure the biological sample while electrophoresis a sample containing the biological sample; and
   a computing unit configured to generate measurement data descriptive of a result of measurement by the measurement unit,
   wherein the biological sample is given two or more types of fluorescent labels different from each other,
   wherein the computing unit is configured to generate first measurement data descriptive of a measurement result obtained by measuring a first sample containing the biological sample while electrophoresis the first sample,
   wherein the computing unit is configured to generate second measurement data descriptive of a measurement result obtained by measuring a second sample containing a reference sample having a reference value serving as a basis for quantifying the biological sample while electrophoresis the second sample, and
   wherein the computing unit is configured to compare a difference between the first measurement data and the second measurement data with a threshold value to thereby determine whether or not it is necessary to reacquire the reference value for quantifying the biological sample by remeasuring the second sample to obtain a third measurement data that replaces the second measurement data before the biological sample is remeasured.

2. The biological sample analysis device according to claim 1, wherein the computing unit is configured to quantify the biological sample contained in the first sample by using first correspondence relation data descriptive of a first correspondence relationship between a first data value described in the first measurement data and a measurement result represented by the first data value,
   wherein the computing unit is configured to quantify the reference sample contained in the second sample by using second correspondence relation data descriptive of a second correspondence relationship between a second data value described in the second measurement data and a measurement result represented by the second data value, and
   wherein the computing unit is configured to calculate the difference by using an amount in which a result of quantifying the biological sample contained in the first sample is different from a result of quantifying the reference sample contained in the second sample.

3. The biological sample analysis device according to claim 1, wherein both the first sample and the second sample contain a first standard substance whose measured value obtained from the measurement unit is known,
   wherein the first measurement data describes a first fluorescence intensity waveform obtained by measuring the first sample while electrophoresis the first sample, wherein the second measurement data describes a second fluorescence intensity waveform obtained by measuring the second sample while electrophoresis the second sample, wherein the computing unit is configured to calculate a first distance between a portion of the first fluorescence intensity waveform representing the biological sample, and a portion of the first fluorescence intensity waveform representing the first standard substance, wherein the computing unit is configured to calculate a second distance between a portion of the second fluorescence intensity waveform representing the reference sample, and a portion of the second fluorescence intensity waveform representing the first standard substance, and wherein the computing unit is configured to calculate a distance difference between the first distance and the second distance as the difference.

4. The biological sample analysis device according to claim 3, wherein the biological sample is a DNA sample, wherein the second sample is an allelic ladder,
wherein the first standard substance is a size standard having a known size serving as a standard size for measuring a DNA fragment length, and
wherein the computing unit is configured to calculate a DNA fragment length of the biological sample by using the first measurement data.

5. The biological sample analysis device according to claim 1, wherein when the difference exceeds the threshold value, the computing unit is configured to output an alarm to that effect.

6. The biological sample analysis device according to claim 1, wherein when the difference exceeds the threshold value, the computing unit is configured to limit the use of the measurement unit so that the biological sample cannot be remeasured until the computing unit acquires the new reference value for quantifying the biological sample through the remeasurement of the second sample.

7. The biological sample analysis device according to claim 1, wherein both the first sample and the second sample contain first and second standard substances whose measured values obtained by the measurement unit are known,
wherein the first measurement data describes a first fluorescence intensity waveform obtained by measuring the first sample while electrophoresis the first sample,
wherein the second measurement data describes a second fluorescence intensity waveform obtained by measuring the second sample while electrophoresis the second sample,
wherein the computing unit is configured to calculate a first distance between a portion of the first fluorescence intensity waveform representing the biological sample, and a portion of the first fluorescence intensity waveform representing the first standard substance, and calculate a second distance between a portion of the first fluorescence intensity waveform representing the biological sample, and a portion of the first fluorescence intensity waveform representing the second standard substance,
wherein the computing unit is configured to calculate a third distance between a portion of the second fluorescence intensity waveform representing the reference sample, and a portion of the second fluorescence intensity waveform representing the first standard substance, and calculate a fourth distance between a portion of the second fluorescence intensity waveform representing the reference sample, and a portion of the second fluorescence intensity waveform representing the second standard substance, and wherein the computing unit is configured to calculate as the difference, an amount in which a first ratio between the first distance and the second distance is different from a second ratio between the third distance and the fourth distance through comparison between the first ratio and the second ratio, or wherein the computing unit is configured to calculate as the difference, an amount in which a first difference between the first distance and the second distance is different from a second difference between the third distance and the fourth distance through comparison between the first difference and the second difference.

8. The biological sample analysis device according to claim 1, wherein the computing unit is configured to acquire a result obtained by quantifying the biological sample contained in the second sample and calculate a standard deviation of the quantification result, and
wherein the computing unit is configured to determine, based on whether the standard deviation reaches a threshold value or more, whether it is necessary to acquire the new reference value for quantifying the biological sample through the remeasurement of the second sample before the biological sample is remeasured.

9. The biological sample analysis device according to claim 1, wherein the measurement unit is configured to measure as a measurement result described by the first measurement data, a first parameter affecting the measurement result of the first sample when the first sample is electrophoresed,
wherein the measurement unit is configured to measure as a measurement result described by the second measurement data, a second parameter affecting the measurement result of the second sample when the second sample is electrophoresed, and
wherein the computing unit is configured to calculate as the difference, an amount in which the first parameter is different from the second parameter through comparison between the first parameter and the second parameter.

10. The biological sample analysis device according to claim 9, wherein the measurement unit is configured to measure as the first parameter and the second parameter, at least any of:
a current value flowing through a sample when the sample is electrophoresed,
at least either a temperature, humidity or atmospheric pressure inside the biological sample analysis device,
at least either a temperature, humidity or atmospheric pressure outside the biological sample analysis device,
a physical property value of a separation medium to be supplied with a sample when the sample is measured,
a physical property value of a buffer solution to be supplied with a sample when the sample is measured,
the number of times the separation medium has been used, or the number of times the buffer solution has been used,
the number of days elapsed since the start day of use of the separation medium or the number of days elapsed since the start day of use of the buffer solution,
a production lot number of the separation medium or a production lot number of the buffer solution,
the number of times a capillary to pass a sample when electrophoresis the sample has been used, the number of days elapsed since the start day of use of the capillary, and a production lot number of the capillary.

11. The biological sample analysis device according to claim 1, wherein the first measurement data describes a first value representing the biological sample contained in the first sample, wherein the second measurement data describes a second value representing the reference sample contained in the second sample, and wherein the computing unit is configured to use as the first value and the second value, at least any of:

a value representing a time when the measurement unit detects the biological sample, a value representing a time length elapsed from the start of measurement by the measurement unit to the detection of the biological sample, and a value representing a time length elapsed from the detection of a substance other than the biological sample contained in the sample by the measurement unit to the detection of the biological sample by the measurement unit.

12. The biological sample analysis device according to claim 1, wherein the biological sample is a DNA sample, wherein the computing unit is configured to generate as the measurement data, a fluorescence intensity waveform obtained by measuring a sample while electrophoresis the sample, wherein the computing unit is configured to calculate the difference by comparing first and second waveforms in the fluorescence intensity waveform between the first measurement data and the second measurement data, and wherein the computing unit is configured to use as the first waveform and the second waveform, at least any of:

a peak position of the fluorescence intensity waveform obtained from a fluorescently labeled sample, a part derived from an X chromosome in the fluorescence intensity waveform, a part in the fluorescence intensity waveform, corresponding to a size standard whose measured value obtained by the measurement unit is known, a part in the fluorescence intensity waveform, corresponding to a quality sensor mixed in a PCR reagent to determine the quality of a PCR reaction, and a part in the fluorescence intensity waveform, corresponding to fluorescent oligonucleotide mixed in a sample as a reference substance.

13. A biological sample analysis method which analyzes a biological sample by using electrophoresis, comprising:

a measuring step of measuring the biological sample while electrophoresis a sample containing the biological sample; and a computing step of generating measurement data descriptive of a result of the measurement in the measuring step, wherein the biological sample is given two or more types of fluorescent labels different from each other, wherein in the computing step, first measurement data descriptive of a measurement result obtained by measuring a first sample containing the biological sample while electrophoresis the first sample is generated, wherein in the computing step, second measurement data descriptive of a measurement result obtained by measuring a second sample containing a reference sample having a reference value serving as a basis for quantifying the biological sample while electrophoresis the second sample is generated, and wherein in the computing step, a difference between the first measurement data and the second measurement data is compared with a threshold value to thereby determine whether or not it is necessary to reacquire the reference value for quantifying the biological sample by remeasuring the second sample to obtain a third measurement data that replaces the second measurement data before the biological sample is remeasured.

14. The biological sample analysis device according to claim 1, wherein the biological sample contained in the first sample and the reference sample contained in the second sample are given a fluorescent label of the same color.

* * * * *